United States Patent [19]
Takahashi et al.

[11] Patent Number: 4,994,306
[45] Date of Patent: Feb. 19, 1991

[54] METHOD FOR APPLYING PLURAL LIQUIDS TO CONTINUOUSLY MOVING NONMAGNETIC CARRIER

[75] Inventors: Shinsuke Takahashi; Norio Shibata; Tsunehiko Sato, all of Kanagawa, Japan

[73] Assignee: Fuji Photo Film Co., Ltd., Minami-Shigara, Japan

[21] Appl. No.: 492,011

[22] Filed: Mar. 12, 1990

[30] Foreign Application Priority Data

Mar. 13, 1989 [JP] Japan .................................. 1-60394

[51] Int. Cl.$^5$ .......................... H01F 10/02; B05D 5/12
[52] U.S. Cl. ..................................... 427/131; 428/900
[58] Field of Search ......................... 427/131; 428/900

[56] References Cited
U.S. PATENT DOCUMENTS

| | | | |
|---|---|---|---|
| 4,746,542 | 5/1988 | Chino et al. | 427/131 |
| 4,921,729 | 5/1990 | Kaneko et al. | 427/131 |

Primary Examiner—Bernard Pianalto
Attorney, Agent, or Firm—Sughrue, Mion, Zinn, Macpeak & Seas

[57] ABSTRACT

A method of simultaneously applying a plurality of liquids to a carrier to form respective layers thereon without causing a chromatic nonuniformity or longitudinal streaking in the layers, and to thus stably manufacture a magnetic recording medium of good magnetic recording properties. Liquids containing organic solvents are simultaneously applied to a continuously moving nonmagnetic carrier by an application head of the extrusion type so as to form respective plural layers on the carrier to manufacture a magnetic recording medium. The difference between the viscosities of the liquids present in the slots of the application head and which are to be applied to the carrier to form at least mutually adjacent ones of the layers is set at 50 cp or less, or the difference between the viscosities of the liquids present in the pockets of the application head or is set at 500 cp or less.

2 Claims, 4 Drawing Sheets

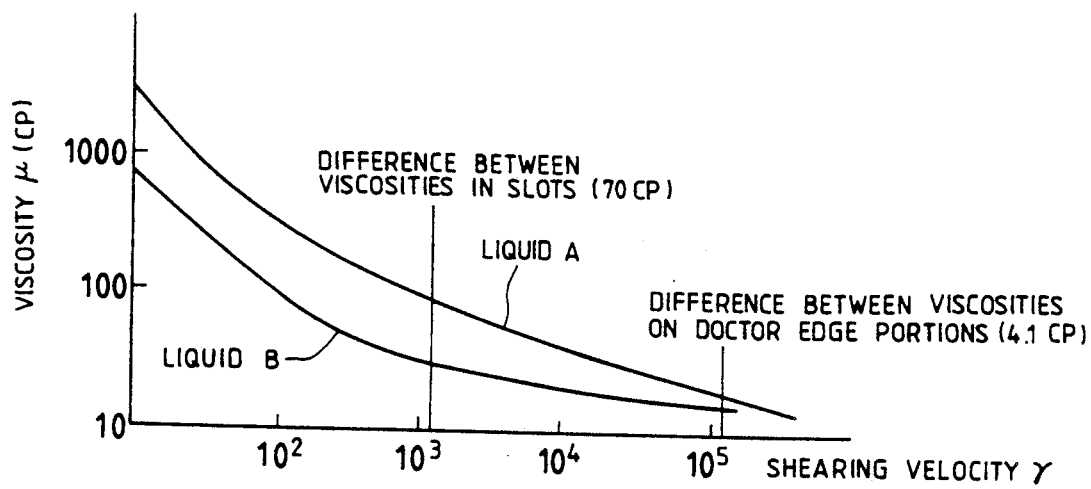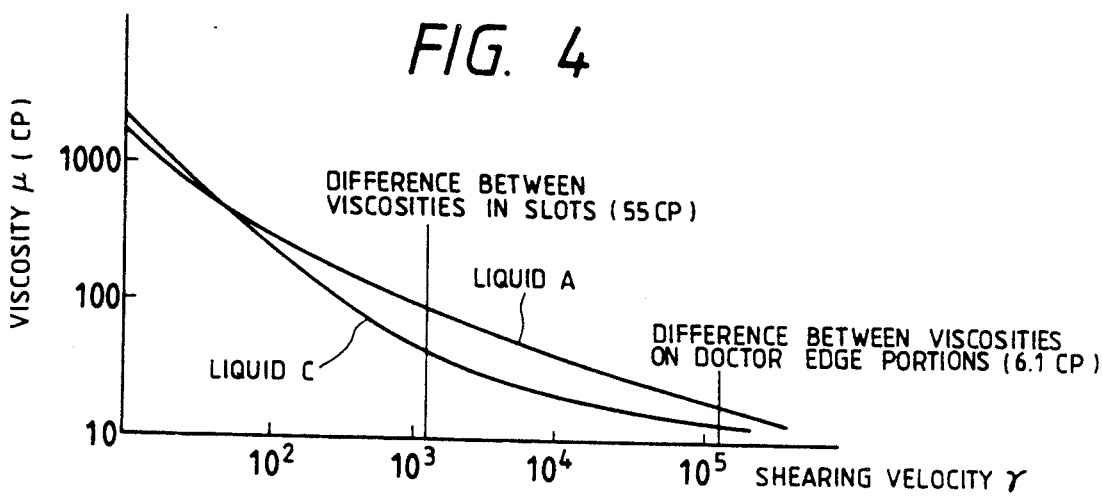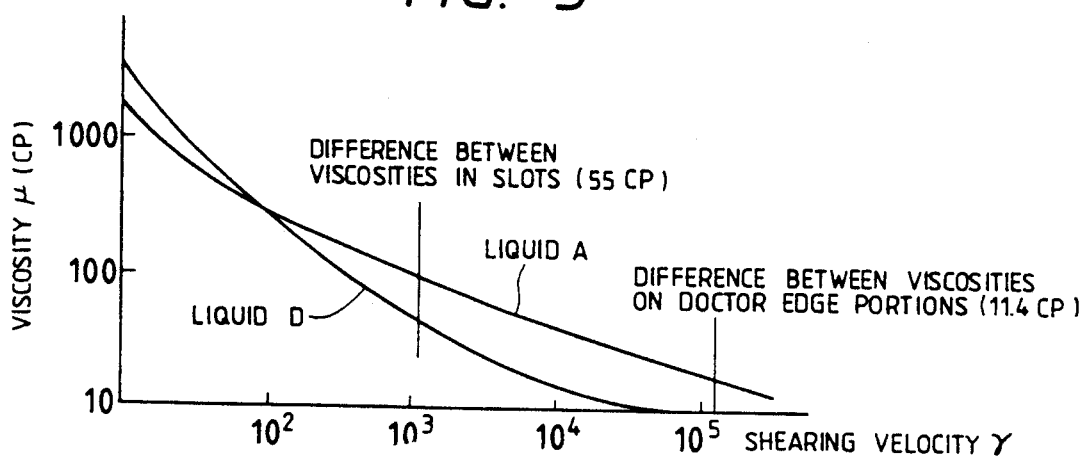

METHOD FOR APPLYING PLURAL LIQUIDS TO CONTINUOUSLY MOVING NONMAGNETIC CARRIER

BACKGROUND OF THE INVENTION

The present invention relates to a method for simultaneously applying a plurality of liquids containing organic solvents to a continuously moving nonmagnetic carrier so as to form mutually stacked layers thereon.

The recent trend has been to increase the density of recording on a magnetic recording medium while decreasing the thickness of the medium. To be able to accomplish this, conventional methods of applying a liquid to a nonmagnetic carrier to form a single magnetic layer thereon have been replaced by method of applying plural liquids to a nonmagnetic carrier to form a plurality of magnetic layers thereon. The reason is because a magnetic recording medium having plural magnetic layers has much better magnetic recording properties such as magnetic data storage capacity than a magnetic recording medium having only a single magnetic layer.

The required number of the plural magnetic layers is two to several. In a conventional method of applying liquids to a nonmagnetic carrier to form such a plurality of magnetic layers, the liquids are applied to the carrier and then dried one after another, as disclosed in the Japanese Patent Applications Nos. 43362/79 and 43816/83 and the Japanese Unexamined Published Patent Applications Nos. 119204/76, 51908/77 and 16604/73.

Since application and drying are repeated in the above-mentioned conventional method, the productivity of the method is generally low and the amount of equipment required is large, and the equipment is bulky and expensive. Moreover, a magnetic recording element is likely to be unmatched on the boundary between the magnetic layers to cause modulation noise or the like.

Therefore, a method of applying plural liquids to a nonmagnetic carrier and then drying the liquids simultaneously to form a plurality of magnetic layers on the carrier has been desired.

A method of simultaneously applying plural liquids to a nonmagnetic carrier to form a plurality of magnetic layers thereon is disclosed in Japanese Unexamined Published Patent Applications Nos. 212933/87 and 124631/87. With this method, however, chromatic nonuniformities and longitudinal streaking are more likely to occur in the magnetic layer, even at a low speed of application, than in the above-mentioned method of repeatedly applying and drying the liquids, if the liquids are a nonmagnetic liquid containing an organic solvent and a magnetic liquid containing an organic solvent or are magnetic liquids containing organic solvents. The occurrence of chromatic nonuniformities and longitudinal streaking cause a conspicuous deterioration of the electromagnetic converting property and external appearance of a magnetic recording tape.

Further, for some combination of liquid compositions, the upper liquid cannot be uniformly applied over the lower liquid on the carrier, namely, two distinct layers cannot be properly formed from the liquids, or the upper liquid cannot be applied on the lower liquid on the carrier at all. This problem becomes more prominent as the applied quantities of the liquids are decreased (that is, the thickness of the layers of the liquids on the carrier are decreased) or the speed of application is increased. Even if the liquids can be applied at some thicknesses to the carrier, the surface of the magnetic recording tape may not be good. If the tape is a video tape or the like and has such a problem, a high video noise level is generated with the tape.

In a method of applying liquids to a carrier to form a plurality of layers thereon to manufacture a photographic photosensitive material, chromatic nonuniformity and longitudinal streaking occur in the layer. One of the causes of this has been presumed to be the fact that the boundary between the layers of the liquids is disturbed due to the differences between the viscosities of the liquids. Thus, the problem has been prevented by reducing the difference between the viscosities of the liquids for the mutually adjacent layers. Since the liquids for the photographic photosensitive material are Newtonian fluids whose physical properties greatly depend on the static viscosities thereof, which can be easily predetermined by appropriately selecting the compositions of the liquids, the problem can be prevented by preparing the liquids so as to make the static viscosities thereof closer to each other.

On the other hand, the magnetic liquids used for the magnetic recording medium are generally non-Newtonian fluids whose viscosity is not constant but varies in accordance with various conditions. For that reason, it has been found difficult to control the magnetic liquid, and hence the above approach of suitably establishing the relative viscosities of the liquids can be only implemented by empirically determinations. Under such circumstances, it is very difficult to obtain a magnetic recording medium of uniform quality with good productivity.

SUMMARY OF THE INVENTION

The present invention was made in order to solve the above-mentioned problems. Accordingly, it is an object of the present invention to provide a method of simultaneously applying a plurality of liquids to a carrier to form respective layers thereon without causing a chromatic nonuniformity or longitudinal streaking in the layers, and to thus stably manufacture a magnetic recording medium of good magnetic recording properties.

Making intensive studies, the present inventors found that values relating to the viscosities of the liquids in the slots and pockets of an application head greatly affect the formation of the thin layers of the applied liquids on a carrier. As a result of further studies, they achieved the present invention.

In the method provided in accordance with the present invention, liquids containing organic solvents are simultaneously applied to a continuously moving nonmagnetic carrier by an application head of the extrusion type so as to form respective plural layers on the carrier to manufacture a magnetic recording medium. The method is characterized in that the difference between the viscosities of the liquids present in the slots of the application head and which are to be applied to the carrier to form at least mutually adjacent ones of the layers is set at 50 cp or less, or the difference between the viscosities of the liquids present in the pockets of the application head is set at 500 cp or less.

The viscosities of the liquids can be easily measured to draw characteristic viscosity curves of the liquids at optional shearing velocities thereof. Even if the liquids are non-Newtonian fluids, the mean value $\gamma_s$ of the shearing velocities $\gamma$ of each of the liquids in the slots of the application head can be approximately determined in accordance with equation (1) below wherein d, W and Q respectively denote the width of the slot, the length of the slot and the flow rate (applied quantity) of the liquid from the slot.

$$\gamma_s = \frac{3Q}{Wd^2} \quad (1)$$

The shearing velocity $\gamma_1$ of each of the liquids on the application edge portions of the application head can be approximately determined in accordance with equation (2) below, wherein v denotes the speed of the movement of the carrier.

$$\gamma_1 = \frac{V^2 W}{2Q} \quad (2)$$

The shearing velocity $\gamma_p$ of each of the liquids in the pockets of the application head can be represented by that of the liquid flowing into the pocket and therefore be approximately determined in accordance with equation (3) below, wherein $Q_i$ and D denote the inflow rate of the liquid to the pocket and the diameter of the pocket, respectively.

$$\gamma_p = \frac{16Q_i}{D^3} \quad (3)$$

The widths of the slots which minimize the difference between the viscosities of the liquids to be simultaneously applied can be approximately determined in accordance with equations (1) and (2). As a result, the domain in which the difference between the viscosities of the liquids to be simultaneously applied is sufficiently small can be made large in a graph indicative of the viscosities. The liquids can thus be simultaneously applied to the carrier in such a desired manner that the difference between the viscosities of the liquids is within the prescribed domain.

Making other intensive studies, the present inventors have found that the difference between the viscosities of the liquids in the slots of the application head can be set at 50 cp or less to regulate the difference between the viscosities of the liquids on the application edge portions of the head to 10 cp or less to stabilize the behavior of the liquids on the boundary thereof at the time of application of the liquids to the carrier to therefore attain good application properties. The domain which renders it possible to attain good application properties can thus be determined, whereby the application conditions can be made stable. Specifically, when the layers of the applied liquids on the carrier are nearly equal to each other in thickness, the difference between the viscosities of the liquids in the slots is a dominant condition for application.

If the layers of the applied liquids on the carrier greatly differ from each other in thickness, as in the case where the uppermost layer (which is formed of the liquid applied to the carrier the farthest downstream) must be smaller in thickness than the layers so as to increase the density of recording in the magnetic recording medium or reduce the cost thereof, the difference between the viscosities of the liquids in the mutually neighboring pockets of the application head is set at 500 cp or less to make the application good and stable.

The reason why the difference between the viscosities of the liquids in the pockets is a major condition for the application is presumed to relate to the fact that the liquids differ from each other in physical properties due to the difference between the hystereses of shearing of the liquids to somehow affect the behavior of the liquids on the boundary between the layers of the applied liquids on the carrier. Particularly when the layers greatly differ form each other in thickness, the slots for the liquids are generally made different from each other in width and the pockets for the liquids are consequently made different from each other in diameter. For that reason, it is presumed that the hystereses of shearing of the liquids before being applied to the carrier are larger factors dominating the physical properties of the liquids, which relate to the behavior of the liquids at a time of the application thereof to the carrier.

Carrying out investigations on the basis of these presumptions, the present inventors have found that the changes in the physical properties of the liquids due to the above mentioned hystereses of shearing greatly depend on the shearing of the liquids flowing into the slots. In other words, the hystereses of shearing of the liquids can be represented by the states of the liquids present immediately upstream of the slots. In studies considering the difference between the viscosities of the liquids in the mutually neighboring pockets located immediately upstream to the slots, it turned out that the difference between the hystereses of shearing of the liquids can be substantially reduced by setting the difference between the viscosities of the liquids in the pockets at 500 cp or less. The physical properties of the liquids can be made closer to each other by thus reducing the difference between the hystereses of shearing thereof to stabilize the behavior of the liquids on the boundary between the liquids being applied in contact with each other to the carrier to make the application good.

According to the present invention, the difference between the viscosities of the liquids in the slots of the application head is adjusted in the main when the layers of the applied liquids on the carrier are nearly equal to each other in thickness. The difference between the viscosities of the liquids in the slots and that between the viscosities of the liquids in the pockets of the application head are adjusted when the layers of the applied liquids on the carrier are greatly different from each other in thickness. Since the conditions in and on the application head are set to make the application good, as described above, the physical properties of the liquid being applied to the carrier to form the mutually adjacent layers thereon can be rendered closer to each other through accurate adjustment, depending on the desired state of the application, to surely keep the behavior of the liquids on the boundary between the layers stable. The conditions such as the difference between the viscosities of the liquids can thus be accurately set well, not empirically as in a conventional process, whether the layers of the applied liquids on the carrier are nearly equal to each other in thickness or greatly different from each other. For that reason, chromatic nonuniformities, longitudinal streaking or the like does not occur in the layers of the applied liquids, and the speed of application can be easily increased, although such cannot be achieved in the conventional art. Therefore, a magnetic recording medium having plural layers and a good surface for desirable magnetic recording properties can be stably manufactured.

The viscosities of the liquids can be adjusted by changing primarily the compositions, temperatures and/or shearing velocities thereof. To change the composition of each of the liquids, the quantity of the solvent for the liquid, which may be a magnetic dispersed liquid, is altered, for example, to create another liquid of the same characteristic viscosity curve as one created by nearly translating the curve of the former. If the quantity of the binder for the liquid is altered to change the composition thereof, another liquid whose characteristic viscosity curve differs in inclination from that of the former is created. As for adjusting the viscosity of the liquid by setting the temperature thereof, the composition thereof does not need to be altered. The viscosity of the liquid can be easily and effectively adjusted by altering the shearing velocity thereof. The shearing velocity of each of the liquids in the slots of the application head can be altered by changing the width of the slot or the flow rate of the liquid therein. The shearing velocity of each of the liquids on the application edge portions of the head can be kept at a desired level by presetting the thickness of the layer of the applied liquid or the speed of movement of the carrier, which is the same as the speed of the application. If a portion of the liquid in the pocket is forcibly extracted from the pocket and the quantity of the portion is adjusted, the shearing velocity of the liquid in the pocket can be altered to adjust the viscosity of the liquid therein without altering the diameter of the pocket and the composition of the liquid. If the width of the slot is to be altered, it may be performed in such a manner that the small top portion of the application head, which directly participates in the application of the liquid to the carrier, is made of a ceramic or a very hard alloy separately from the other portion of the head and a number of such small top portions attachable thereto and detachable therefrom are prepared, thus making it easy to change the width of the slot.

In a method provided in accordance with the present invention, liquids are simultaneously applied to a carrier by an application head of the extrusion type so as to form mutually stacked layers thereon to manufacture a magnetic recording medium. When the layers of the applied liquids on the carrier are nearly equal to each other in thickness, the difference between the viscosities of the liquids present in the slots of the application head and which are to be applied to the carrier to form at least mutually adjacent ones of the layers is set at 50 cp or less so that conditions for making the application good are always secured. For that reason, the difference between the viscosities of the liquids present on the application edge portions of the application head so as to be applied to the carrier is reduced to stabilize the behavior of the liquids being applied to the carrier. As a result, the liquids forming the mutually adjacent layers on the carrier do not mix with each other, and chromatic nonuniformities and longitudinal streaking do not occur in the layers thus formed. The application is thus made good and stable.

When the layers of the applied liquids on the carrier are greatly different from each other in thickness, not only is the difference between the viscosities of the liquids present in the slots of the application head set at 50 cp or less, but also that between the viscosities of the liquids present in the pockets of the application head so as to flow into the slots is set at 500 cp or less so that the difference between the hystereses of shearing of the liquids to be applied to the carrier to form the layers is reduced to thus reduce the differences between the physical properties of the liquids which result from the differences between the hystereses of shearing of the liquids. As a result, the behavior of the liquids on the boundary of the mutually adjacent layers of the liquids being applied to the carrier is stabilized. For that reason, even if the widths of the slots are reduced to decrease the thicknesses of the layers, the viscosities of the liquids can be accurately and consistently set, not empirically as in the conventional practice, so that conditions for making the application good are secured. Therefore, chromatic nonuniformities, longitudinal streaking or the like does not occur in the layers, namely, the surface of the magnetic recording medium is made good, and the speed of the application can be increased.

A magnetic recording medium having the plural layers and good in magnetic recording properties can thus be efficiently manufactured, whether the layers are nearly equal to each other in thickness or greatly different from each other therein.

BRIEF DESCRIPTION OF THE DRAWINGS

FIGS. 3, 4, 5, 6, 7, 8 and 9 are graphs indicative of the characteristic viscosity curves of liquids to be applied.

DESCRIPTION OF THE PREFERRED EMBODIMENTS

The effects of the present invention will be clarified hereinafter through the description of actual examples of the invention.

Example 1

A first actual example will hereafter be described in detail. Magnetic liquids of compositions shown hereinafter were prepared.

| Composition | |
|---|---|
| Co-$\gamma$-Fe$_2$O$_3$ (Hc 550 Oe) | 100 parts by weight |
| Copolymer of vinyl chloride, vinyl acetate and vinyl alcohol | X parts by weight |
| Polyurethane resin (Nipporan 2301 manufactured by Nippon Polyurethane Industry Co., Ltd.) | 8 parts by weight |
| Polyisocyanate (Coronate L manufactured by Nippon Polyurethane Industry Co., Ltd.) | 8 parts by weight |
| Carbon black (20 $\mu$m mean grain diameter) | 12 parts by weight |
| Stearic acid | 1 part by weight |
| Butyl stearate | 1 part by weight |
| Solvents | |
| Methylethyl ketone | Y parts by weight |
| Butyl acetate | Z parts by weight |

The quantities of the copolymer, the methlethyl ketone and the butyl acetate were set as shown in Table 1 to prepare the five magnetic liquids A, B, C, D and E.

TABLE 1

| Liquid | A | B | C | D | E |
|---|---|---|---|---|---|
| Copolymer (X parts by weight) | 10 | 15 | 20 | 20 | 20 |
| Methylethyl ketone (Y parts by weight) | 200 | 200 | 200 | 250 | 150 |
| Butyl acetate (Z parts by weight) | 100 | 100 | 100 | 100 | 100 |

Figure 1:
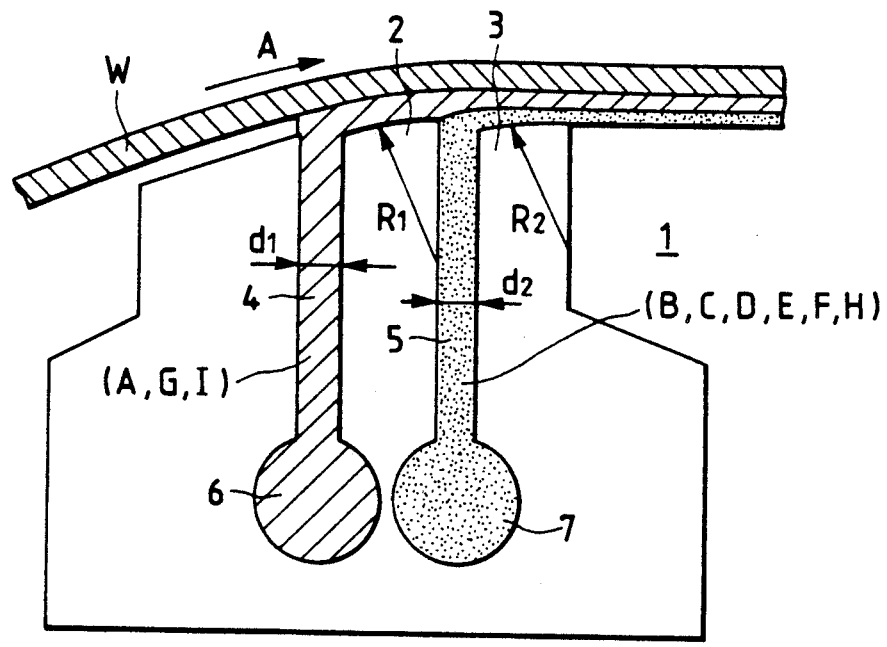
FIG. 1 is a sectional view of an application head for application in a preferred embodiment of a method of the present invention.

The viscosities of the liquids A, B, C, D, and E were measured by a Loto Visco-meter and the characteristic viscosity curves of the liquids, each of which indicates the relationship between the viscosity and shearing velocity thereof, were drawn. The liquid A and each of the other liquids B, C, D and E were applied to a carrier made of polyethylene terephthalate and having a thickness of 15 μm in such a manner that the liquid A formed the lower layer on the carrier and each of the other liquids B, C, D and E an upper layer on the lower layer. Specimens Nos. 1, 2, 3 and 4 were thus manufactured from the carriers and the liquids. An application head 1 of the extrusion type, which is shown in FIG. 1 and from the pockets of which the liquids were not extracted at all, were used for the application. The radius of curvature $R_1$ of the surface of the upstream doctor edge portion 2 of the head 1, the radius of curvature $R_2$ of the surface of the downstream doctor edge portion 3 of the head, which is located behind the upstream doctor edge portion with regard to the direction of the movement of the carrier W, and the widths of the slots of the head were 6 mm, 6 mm, 0.5 mm and 0.5 mm, respectively. The speed V of the application, the tension of the liquid-applied portion of the carrier W, the width w of the liquid-applied area of the carrier, and the applied quantity Q of each of the liquids for the layers were 300 m/min, 10 kg per 500 mm in width, 500 mm, and 3,000 cc/min, respectively. The applied quantity Q of 3,000 cc/min corresponds to 20 cc/m² in the volume of the liquid layer or about 4 μm in the thickness thereof.

It was observed whether the application was performed well or not as to each of the Specimens Nos. 1, 2, 3 and 4. The results of the observation are shown in Tables 2, 3, 4 and 5. Since the shearing velocity γ of the liquid in the slot and that of the liquid on the doctor edge portion were 1,200 and 125,000, the difference between the viscosities of the liquids A, B, C, D and E for each of the Specimens could be determined.

TABLE 2

| | Specimen No. 1 (Refer to FIG. 3) | | | | |
|---|---|---|---|---|---|
| Liquid | Viscosity in slot (cp) | Difference between viscosities in slots (cp) | Difference between viscosities on doctor edge portions (cp) | Difference between viscosities on doctor edge portions (cp) | Evaluation |
| A | 100.00 | 70 | 20.1 | 4.1 | X |
| B | 30.0 | | 16.0 | | |

TABLE 3

| | Specimen No. 2 (Refer to FIG. 4) | | | | |
|---|---|---|---|---|---|
| Liquid | Viscosity in slot (cp) | Difference between viscosities in slots (cp) | Difference between viscosities on doctor edge portions (cp) | Difference between viscosities on doctor edge portions (cp) | Evaluation |
| A | 100.00 | 55 | 20.1 | 6.1 | ΔX |
| C | 45.0 | | 14.0 | | |

TABLE 4

| | Specimen No. 3 (Refer to FIG. 5) | | | | |
|---|---|---|---|---|---|
| Liquid | Viscosity in slot (cp) | Difference between viscosities in slots (cp) | Difference between viscosities on doctor edge portions (cp) | Difference between viscosities on doctor edge portions (cp) | Evaluation |
| A | 100.00 | 55 | 20.1 | 11.4 | X |
| D | 45.0 | | 8.7 | | |

TABLE 5

Figure 6:
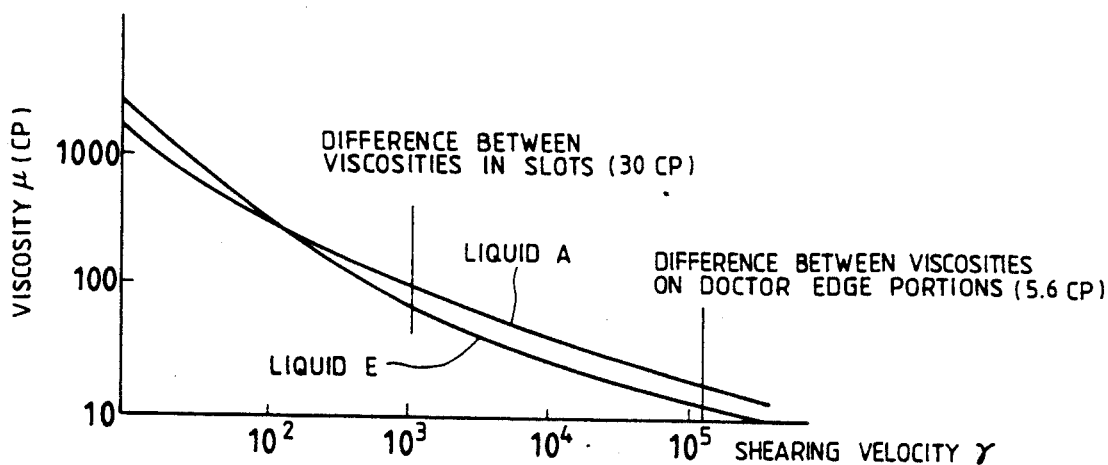

| | Specimen No. 4 (Refer to FIG. 6) | | | | |
|---|---|---|---|---|---|
| Liquid | Viscosity in slot (cp) | Difference between viscosities in slots (cp) | Difference between viscosities on doctor edge portions (cp) | Difference between viscosities on doctor edge portions (cp) | Evaluation |
| A | 100.00 | 30 | 20.1 | 5.6 | O |
| D | 70.0 | | 14.5 | | |

Example 2

The same liquids as Example 1 were applied to the same type of carrier by an application head different in the widths of the slots from that for Example 1. The application was performed in the same manner as in the case of Example 1, except for the application head. Specimens Nos. 5, 6, 7 and 8 were thus manufactured. The conditions and results of the application are shown in Tables 6, 7, 8 and 9.

As for the Specimen No. 5 shown in Table 6, the width $d_1$ of the slot for forming the lower layer of the liquid A on the carrier and that $d_2$ of the other slot for forming the upper layer of the other liquid B on the lower layer were 0.5 mm and 1.0 mm, respectively. The shearing velocity of the liquid A in the slot and that of the other liquid B in the other slot were 1,200 and 300, respectively. The shearing velocity of each of the liquids on the doctor edge portions of the application head was 125,000.

occur in the surface of the Specimen, namely, the application was good. The symbol Δ in the Tables means that the Specimen can be put in practical use but is slightly unsatisfactory. The symbol X in the means that a large

TABLE 6

Figure 7:
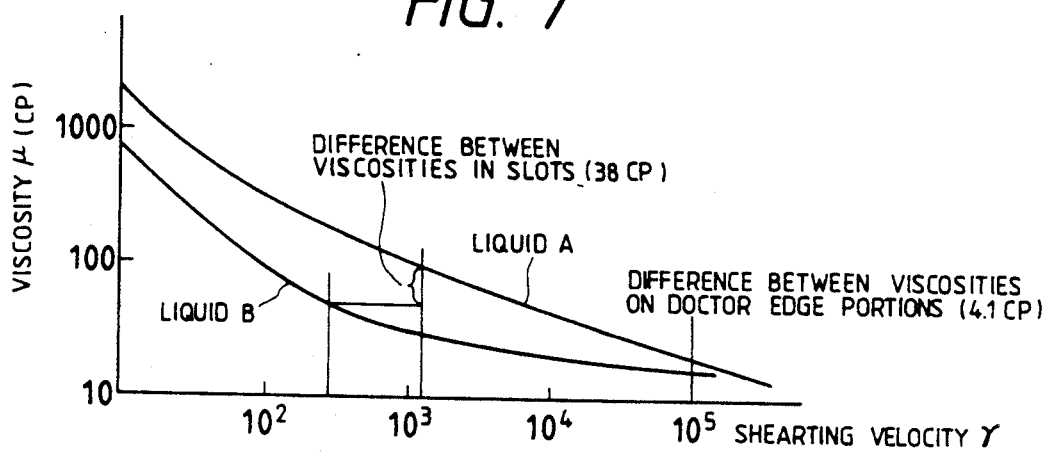

Specimen No. 5 (Refer to FIG. 7)

| Liquid | Viscosity in slot (cp) | Difference between viscosities in slots (cp) | Difference between viscosities on doctor edge portions (cp) | Difference between viscosities on doctor edge portions (cp) | Evaluation |
|---|---|---|---|---|---|
| A | 100.00 | 38 | 20.1 | 4.1 | O |
| B | 62.0 | | 16.0 | | |

As for Specimen No. 6 shown in Table 7, the width $d_1$ of the slot for forming the lower layer of the liquid A on the carrier and that $d_2$ of the other slot for forming the upper layer of the other liquid B on the lower layer were 0.5 mm and 0.8 mm, respectively. The shearing velocity γ of each of the liquids A and B on the doctor edge portions was 125,000.

number of chromatic nonuniformities and much longitudinal streaking occurred in the surface of the Specimen, namely, the Specimen cannot be put in practical use.

Example 3

Four liquids F, G, H and I were prepared in the same

TABLE 7

Specimen No. 6 (Refer to FIG. 7)

| Liquid | Viscosity in slot (cp) | Difference between viscosities in slots (cp) | Difference between viscosities on doctor edge portions (cp) | Difference between viscosities on doctor edge portions (cp) | Evaluation |
|---|---|---|---|---|---|
| A | 100.00 | 45 | 20.1 | 4.1 | O |
| B | 55 | | 16.0 | | |

As for Specimen No. 7 shown in Table 8, the width $d_1$ of the slot for forming the lower layer of the liquid A on the carrier and that $d_2$ of the other slot for forming the upper layer of the other liquid B on the lower layer were 0.5 mm and 0.7 mm, respectively. The shearing velocity γ of each of the liquids A and B on the doctor edge portions was 125,000.

manner as in Example 1, except that the quantities of the copolymer of vinyl chloride, vinyl acetate and vinyl alcohol, the methylethyl ketone and the butyl acetate were set as shown in Table 10.

TABLE 10

| Liquid | F | G | H | I |
|---|---|---|---|---|

TABLE 8

Specimen No. 7 (Refer to FIG. 7)

| Liquid | Viscosity in slot (cp) | Difference between viscosities in slots (cp) | Difference between viscosities on doctor edge portions (cp) | Difference between viscosities on doctor edge portions (cp) | Evaluation |
|---|---|---|---|---|---|
| A | 100.00 | 51 | 20.1 | 4.1 | Δ |
| B | 49 | | 16.0 | | |

As for Specimen No. 8 shown in Table 9, the width $d_1$ of the slot for forming the lower layer of the liquid A on the carrier and that $d_2$ of the other slot for forming the upper layer of the liquid E on the lower layer were 1.0 mm and 0.5 mm, respectively. The shearing velocity γ of the liquid A in the slot and that of the liquid E in the other slot were 300 and 1,200 respectively. The shearing velocity of each of the liquids A and E on the doctor edge portions was 125,000.

| Copolymer (X parts by weight) | 10 | 15 | 15 | 10 |
|---|---|---|---|---|
| Methylethyl ketone | 100 | 100 | 150 | 100 |
| Butyl acetate (Z parts by weight) | 100 | 100 | 100 | 100 |

The viscosities of the liquids F, G, H and I were measured to allow characteristic viscosity curves of the liquids, each of which indicates the relationship between the viscosity and shearing velocity of the liquid, to be drawn. The liquid F and each of the other liquids

TABLE 9

Figure 8:
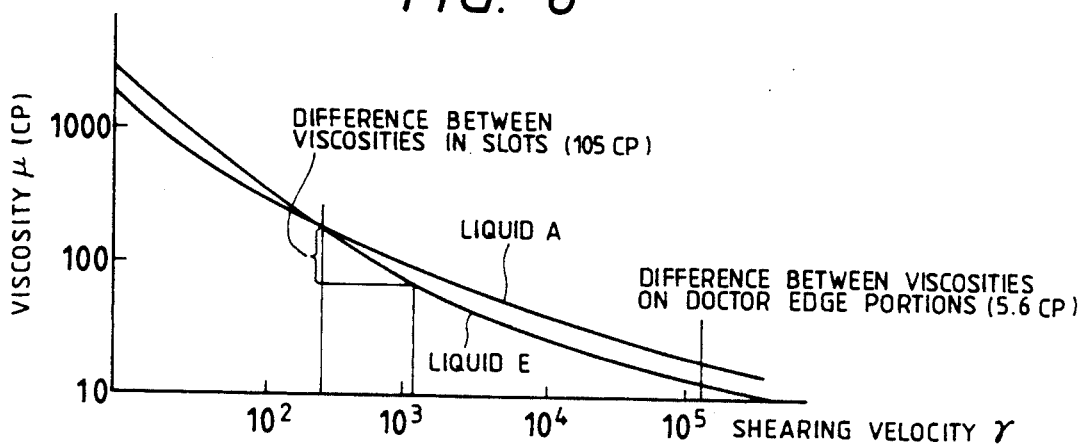

Specimen No. 8 (Refer to FIG. 8)

| Liquid | Viscosity in slot (cp) | Difference between viscosities in slots (cp) | Difference between viscosities on doctor edge portions (cp) | Difference between viscosities on doctor edge portions (cp) | Evaluation |
|---|---|---|---|---|---|
| A | 175.0 | 105 | 20.1 | 5.6 | X |
| B | 70.0 | | 14.5 | | |

As understood from Tables 2, 3, 4, 5, 7, 8, and 9, simultaneously applying the liquids to the carrier surely and well so as to form the plural layers thereon is enabled by setting the difference between the viscosities of the liquids in the slots at 50 cp or less.

Figure 2:
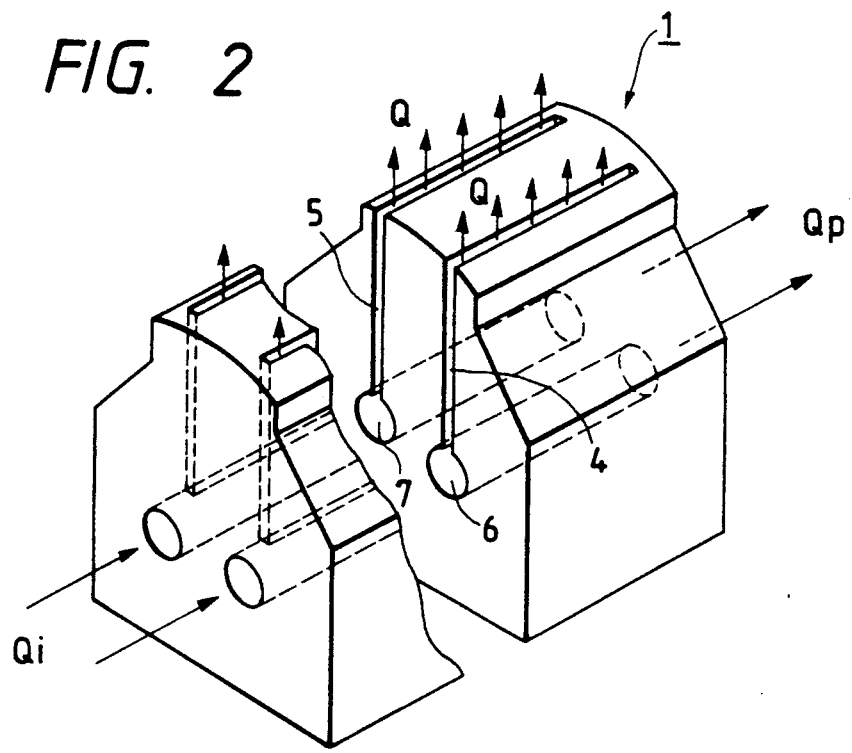
FIG. 2 is a perspective view of an application head for application in a method of another embodiment of the present invention.

The symbol O in the Tables means that a chromatic nonuniformities and longitudinal streaking did not G, H and I were applied to a carrier made of polyethylene terephthalate and having a thickness of 15 μm, so that the liquid F formed a lower layer on the carrier and each of the other liquids G, H and I an upper layer on the lower layer. Specimens Nos. 9, 10, 11, 12, 13, 14, 15, 16, 17 and 18 were thus manufactured from the carrier and the liquids. An application head 1 of the extrusion type, which is shown in FIG. 2 and from the pockets of which the liquids are partly extracted, was used for the application. The radius of curvature $R_1$ of the surface of the upstream doctor edge portion of the head 1 and that $R_2$ of the surface of the downstream doctor edge portion 3 thereof, which is located behind the upstream doctor edge portion with regard to the direction of the movement of the carrier W, were both 6 mm. The other conditions for the application were as follows:

| | |
|---|---|
| Diameter of pocket | 15 mm or 8 mm |
| Width of slot | 0.4 mm or 0.15 mm |
| Width of application | 500 mm |
| Speed of application | 300 m/min. |
| Applied quantity | 20 cc/m$^2$, 5 cc/m$^2$ or 2.5 cc/m$^2$ (5 cc/m$^2$ corresponds to about 1 μm in layer thickness.) |
| Extracted quantity | 300 cc/min. or 900 cc/min. |

Figure 9:
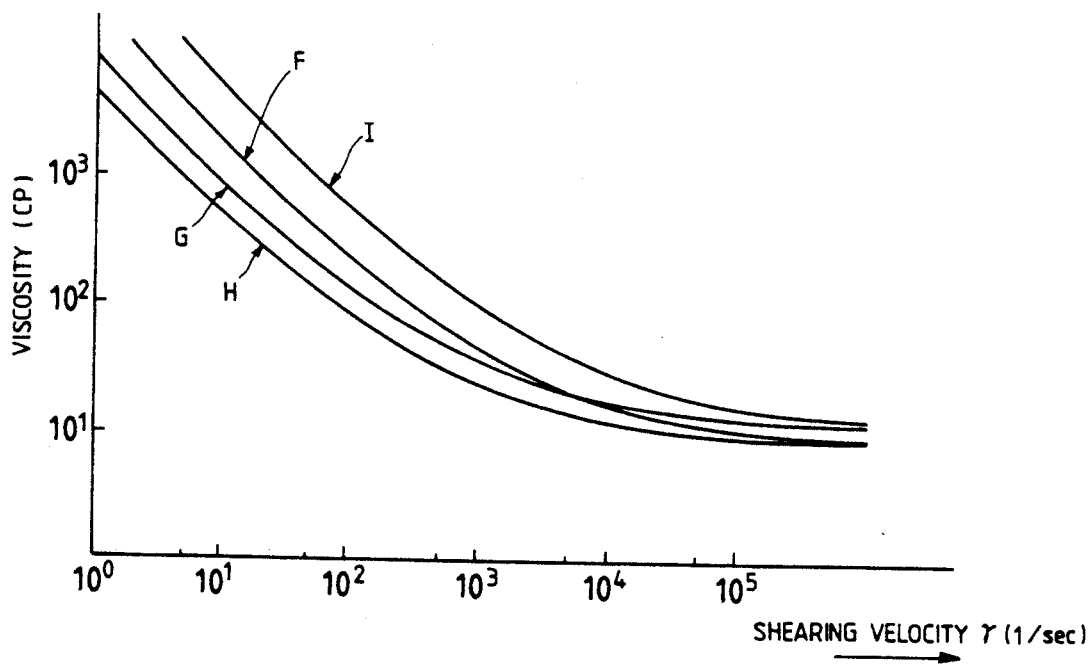

It was observed whether the application was good or not as to the various Specimens. The results of the observation are shown in Tables 10, 11, 12, 13, 14, 15, 16, 17, 18, 19, 20, 21, 22 and 23. FIG. 9 shows the characteristic viscosity curves of the liquids F, G, H and I, each of which indicates the relationship between the viscosity and shearing velocity of the liquid. The application head used for the application functions to make the upper and the lower layers of the liquids on the carrier W, as shown in FIGS. 1 and 2. The application head has a pocket 6 for forming the lower layer, a slot 4 communicating with the pocket to form the lower layer, a pocket 7 for forming the upper layer, and a slot 5 communicating with the pocket 7 to form the upper layer. The liquids supplied into the pockets 6 and 7 through the ends thereof are discharged therefrom to the slots 4 and 5 in the prescribed quantities, while some portions of the liquids are forcibly extracted from the pockets through the other ends thereof.

The upper layers of Specimens Nos. 9, 10 and 11 were reduced in thickness in that order with the use of the same application head. As understood from the results of the application for the Specimens Nos. 9 and 10, the difference between the viscosities of the liquids in the pockets more affected the state of the surface of the Specimen as the difference between the thicknesses of the layers thereof increased.

As for Specimens Nos. 12 and 13, the width of the slot was decreased to set the difference between the viscosities of the liquids in the slots below 50 cp, but the results of the application were not good.

As for Specimens Nos. 14 and 15, the diameter of the pocket was changed to set the difference between the viscosity ties of the liquids in the pockets below 500 cp, and the results of the application were good.

As for Specimens Nos. 16 and 17, the diameter of the pocket was not changed, the physical properties of the liquids were altered, and the results of the application were good.

As for Specimen No. 18, the extracted quantity of the liquid from the pocket was changed to alter the flow velocity of the liquid therein, and the result of the application was good.

As for Specimen No. 19, the same application head as Specimen No. 15 was used to apply the liquid G for the lower layer and the liquid F for the upper layer. Since the difference between the viscosities of the liquids in the slots was large, the result of application for the Specimen No. 19 was not good, unlike Specimen No. 15.

As for Specimen No. 20, the same application head as in the case of Specimen No. 16 was used to apply the liquid G for the lower layer and the liquid H for the upper layer. Since the difference between the viscosities of the liquids in the slots were slightly larger than 50 cp, the result of the application for the Specimen No. 20 was not so good as that for the Specimen No. 16 but fairly good.

As for Specimen No. 21, the same application head as the Specimen No. 17 was used to apply the liquid I for the lower layer and the liquid F for the upper layer. Since the difference between the viscosities of the liquids in the slots was slightly larger than 50 cp, the result of the application for Specimen No. 21 was not so good as that for Specimen No. 17 but fairly good.

As for Specimen No. 22, the same application head as in the case of Specimen No. 18 was used to apply the liquid G for the lower layer and the liquid F for the upper layer as the extracted quantity of the liquid F was made larger than that for Specimen No. 18 to change the flow velocity of the liquid in the pocket. However, since the difference between the viscosities of the liquids in the slots was too large, the result of the application for the Specimen No. 22 was not so good as that for Specimen No. 17.

TABLE 11

Specimen No. 9 (thickness of upper layer: 4 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.4 mm | 1875 | 33.3 cp | 4.7 cp | 15 mm | 83 | 260 cp | 110 cp | O |
| Lower Layer | G | 0.4 mm | 1875 | 28.6 cp | | 15 mm | 83 | 150 cp | | |

TABLE 12

Specimen No. 10 (thickness of upper layer: 1 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.4 mm | 469 | 73.0 cp | 44.4 cp | 15 mm | 26 | 700 cp | 550 cp | X |
| Lower Layer | G | 0.4 mm | 1875 | 28.6 cp | | 15 mm | 83 | 150 cp | | |

TABLE 13

Specimen No. 11 (thickness of upper layer: 0.5 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.4 mm | 234 | 118 cp | 89.6 cp | 15 mm | 17 | 1030 cp | 880 cp | X |
| Lower Layer | G | 0.4 mm | 1875 | 28.6 cp | | 15 mm | 83 | 150 cp | | |

TABLE 14

Specimen No. 12 (thickness of upper layer: 1 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 3333 | 25.8 cp | 2.8 cp | 15 mm | 26 | 700 cp | 550 cp | ΔX |
| Lower Layer | G | 0.4 mm | 1875 | 28.6 cp | | 15 mm | 83 | 150 cp | | |

TABLE 15

Specimen No. 13 (thickness of upper layer: 0.5 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 1667 | 35.3 cp | 6.7 cp | 15 mm | 17 | 1030 cp | 850 cp | X |
| Lower Layer | G | 0.4 mm | 1875 | 28.6 cp | | 15 mm | 83 | 150 cp | | |

TABLE 16

Specimen No. 14 (thickness of upper layer: 1 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 3333 | 25.8 cp | 2.8 cp | 8 mm | 174 | 150 cp | 0.0 cp | O |
| Lower Layer | G | 0.4 mm | 1875 | 28.6 cp | | 15 mm | 83 | 150 cp | | |

TABLE 17

Specimen No. 15 (thickness of upper layer: 0.5 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 1667 | 35.3 cp | 6.7 cp | 8 mm | 112 | 210 cp | 60 cp | O |
| Lower Layer | G | 0.4 mm | 1875 | 28.6 cp | | 15 mm | 83 | 150 cp | | |

TABLE 18

Specimen No. 16 (thickness of upper layer: 0.5 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 1667 | 20.0 cp | 8.6 cp | 15 mm | 17 | 310 cp | 160 cp | O |
| Lower Layer | G | 0.4 mm | 1875 | 28.6 cp | | 15 mm | 83 | 150 cp | | |

TABLE 19

Specimen No. 17 (thickness of upper layer: 0.5 μm; thickness of lower layer: 4 μm)

| | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 1667 | 35.3 cp | 30.6 cp | 15 mm | 17 | 1030 cp | 380 cp | O |
| Lower | I | 0.4 | 1875 | 65.9 cp | | 15 mm | 83 | 650 cp | | |

TABLE 19-continued

Specimen No. 17 (thickness of upper layer: 0.5 μm; thickness of lower layer: 4 μm)

| Layer | Liquid | Slot mm | Shearing velocity | Viscosity | Difference | Pocket | Shearing Velocity | Viscosity | Difference | Evaluation |
|---|---|---|---|---|---|---|---|---|---|---|

TABLE 20

Specimen No. 18 (thickness of upper layer: 0.5 μm; thickness of lower layer: 4 μm)

| Layer | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.15 mm | 1667 | 35.3 cp | 6.7 cp | 15 mm | 32 | 590 cp | 440 cp | O |
| Lower Layer | G | 0.4 mm | 1875 | 28.6 cp | | 15 mm | 83 | 150 cp | | |

(Liquid F extraction increased from 300 g/min to 900 g/min)

TABLE 21

Specimen No. 19 (thickness of upper layer: 0.5 μm; thickness of lower layer: 4 μm)

| Layer | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.4 mm | 234 | 118 cp | 89.4 cp | 8 mm | 112 | 210 cp | 60 cp | X |
| Lower Layer | G | 0.4 mm | 1875 | 28.6 cp | | 15 mm | 83 | 150 cp | | |

TABLE 22

Specimen No. 20 (thickness of upper layer: 0.5 μm; thickness of lower layer: 4 μm)

| Layer | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.55 mm | 86.9 | 86.9 cp | 58.3 cp | 15 mm | 17 | 310 cp | 160 cp | △ |
| Lower Layer | G | 0.4 mm | 1875 | 28.6 cp | | 15 mm | 83 | 150 cp | | |

TABLE 23

Specimen No. 21 (thickness of upper layer: 0.5 μm; thickness of lower layer: 4 μm)

| Layer | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.4 mm | 234 | 118 cp | 52.1 cp | 15 mm | 17 | 1030 cp | 380 cp | △ |
| Lower Layer | I | 0.4 mm | 1875 | 665.9 cp | | 15 mm | 83 | 650 cp | | |

TABLE 24

Specimen No. 22 (thickness of upper layer: 0.5 μm; thickness of lower layer: 4 μm)

| Layer | Liquid | Slot | Shearing velocity | Viscosity | Difference | Pocket | Shearing Velocity | Viscosity | Difference | Evaluation |
|---|---|---|---|---|---|---|---|---|---|---|
| Upper Layer | F | 0.4 mm | 234 | 118 cp | 89.4 cp | 15 mm | 32 | 590 cp | 440 cp | X |
| Lower Layer | G | 0.4 mm | 1875 | 28.6 cp | | 15 mm | 83 | 150 cp | | |

(Liquid F extraction increased from 300 g/min to 900 g/min)

Figure 10:
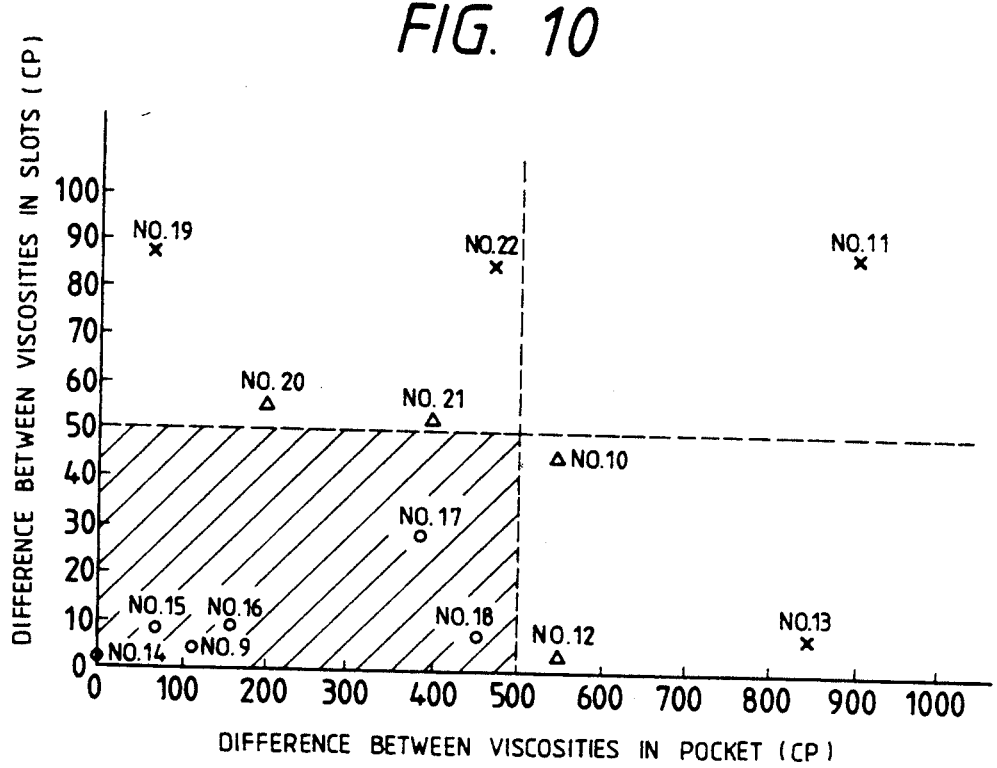
FIG. 10 is a graph indicative of results of application with regard to viscosity differences.

As understood from the above Tables and FIG. 10 having a hatched region indicative of good application, the liquids can be simultaneously applied to the carrier surely and well so as to form a plurality of layers thereon by setting the difference between the viscosities of the liquids in the pockets at 500 cp or less, even if the thickness of the upper layer is only about 20 % of that of the lower layer so that the difference between the thicknesses is very large.

Shown in the drawings are an application head 1, an upstream doctor edge portion 2, a downstream doctor edge portion 3, a slot 4 for a lower layer, a slot 5 for an upper layer, a pocket 6 for the lower layer, a pocket 7 for the upper layer, applied liquids A, B, C, D, E, F, G, H and I, and a carrier W.

What is claimed is:

1. In a method in which a plurality of liquids containing organic solvents are simultaneously applied to a continuously moving nonmagnetic carrier by a common application head of the extrusion type having a plurality of extrusion slots and liquid pockets communicating with said slots, one of said liquids containing a magnetic liquid and being a non-Newtonian fluid, whereby mutually stacked layers are made of said liquids on said carrier to manufacture a magnetic recording medium, the improvement wherein a difference between the viscosities of said liquids when said liquids pass through said slots of said head for application to said carrier to form at least mutually adjacent ones of said layers is set at 50 cp or less.

2. The method according to claim 1, wherein the difference between the viscosities of the liquids present in said pockets of the application head is set at 500 cp or less.

* * * * *